Feb. 18, 1930. M. TRESCHOW 1,747,609
TUBE MILL, ETC
Filed April 10, 1928 2 Sheets-Sheet 1

INVENTOR
Michael Treschow
BY
Redding, Greeley, O'Shea & Campbell
ATTORNEYS

Feb. 18, 1930.  M. TRESCHOW  1,747,609
TUBE MILL, ETC
Filed April 10, 1928  2 Sheets-Sheet 2
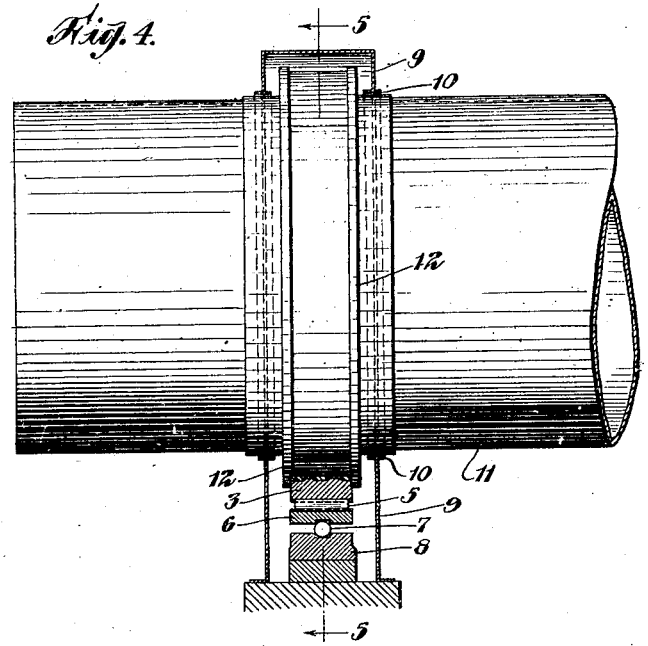
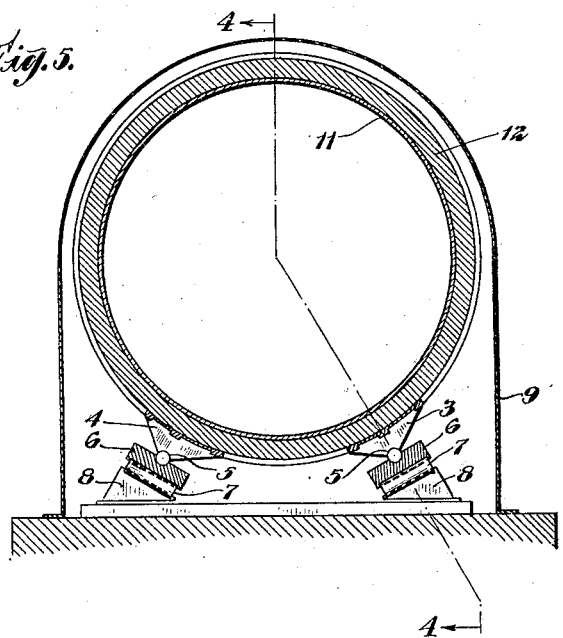

Patented Feb. 18, 1930

1,747,609

UNITED STATES PATENT OFFICE

MICHAEL TRESCHOW, OF COPENHAGEN, DENMARK, ASSIGNOR TO F. L. SMIDTH & CO., OF NEW YORK, N. Y., A CORPORATION OF NEW JERSEY

TUBE MILL, ETC.

Application filed April 10, 1928, Serial No. 268,942, and in Great Britain December 6, 1927.

This invention is concerned with the support of large rotary drums, such as tube mills, ball mills, etc. Such drums sometimes have a diameter as much as ten feet and the total weight of a drum with its load sometimes reaches as much as five hundred and sixty thousand pounds.

Such drums are sometimes supported for rotation by bearing rolls commonly located one at each side of the lowest point of the drum and co-acting with turned rings applied to the exterior of the drum. Theoretically the area of contact between each bearing roll and the bearing ring is no more than a line and practically it is but little more. Consequently the bearing pressure per unit area is exceedingly high and the practically inevitable lack of homogeneity in the material of the bearing ring and also of the supporting rolls, results in deformation of the ring and the rolls, which increases rapidly and causes severe shocks during the operation of the mill. Furthermore, each roller support must have two bearings, or four bearings for both rollers, with consequent friction losses at each bearing and multiplication of parts to be kept up.

Such drums are also supported sometimes by hollow trunnions, usually one at each end of the drum, which are journaled in ordinary sliding-friction bearings. Conditions of operation, involving the passage of materials into and out of the drum, make it desirable that the trunnions shall be as large as practicable, sometimes reaching a diameter of thirty-six inches. All pressure is transmitted to the bearings below the horizontal diameter of the trunnions and is practically restricted to about 45° at each side of the lowest point. Under these conditions, also, the friction losses are very great.

In the development of the present invention it has been found that all of these difficulties can be largely overcome, with diminished friction losses, by supporting the drum by independent, sliding-friction shoes which are disposed one at each side of the vertical central plane of the drum and are themselves so supported that they may adjust themselves automatically to the surface of the bearing ring with which they coact. Each of such shoes is relatively short, contacting with but a relatively small portion of the surface of the bearing ring, and is of such a character and so arranged that lubrication of the contacting surfaces can be maintained.

The drum may be somewhat reduced to receive the bearing ring, if conditions make it desirable, but preferably the bearing ring is applied directly to the shell of the drum without reduction of the shell, the possible weakening of the shell by reduction in diameter being thus avoided. In spite of the fact that friction loss increases with the diameter of the bearing, this arrangement is generally preferable because the friction loss can be kept within suitable limits when the supporting shoes are themselves so supported as to accommodate themselves to the surface of the bearing ring and efficient lubrication is provided.

The invention will be more fuly explained hereinafter with reference to the accompanying drawings in which it is illustrated and in which:

Figure 4 is a view similar to Figure 1, but showing the bearing ring applied to the shell without reduction in diameter of the latter, the plane of section being indicated by the broken line 4—4 of Figure 5.

Figure 5 is a view in transverse section on the plane indicated by the broken line 5—5 of Figure 4.

Figure 1:
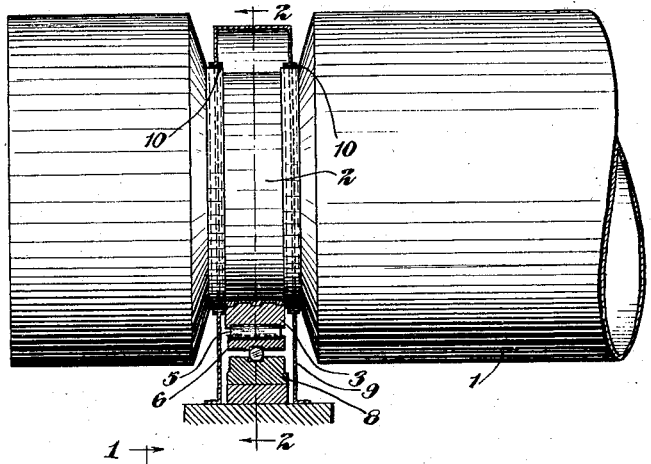
Figure 1 is a view in side elevation of a portion of a drum with the shell reduced somewhat to receive the bearing ring, one of the supporting shoes being shown in section on the plane indicated by the broken line 1—1 of Figure 2.
Figure 2:
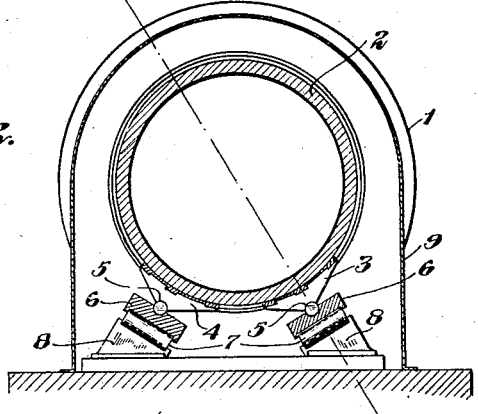
Figure 2 is a view in transverse section on the plane indicated by the broken line 2—2 of Figure 1.
Figure 3:
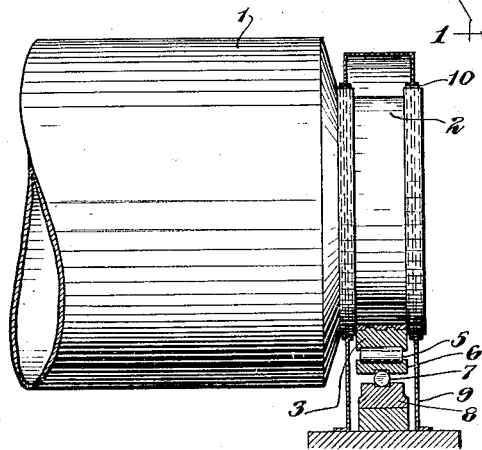
Figure 3 is a view generally similar to Figure 1, but showing the bearing ring applied at the end of the drum.

In Figures 1, 2 and 3 of the drawings the shell 1 of the drum is represented in outline and may be of any usual or suitable construction. The turned bearing ring 2 is shown in Figures 1 and 2 as applied to an intermediate portion of the shell somewhat reduced in diameter while in Figure 3 the reduced portion of the shell is shown as at the end of the drum. In Figures 4 and 5 the shell 11 is represented as having no reduction and the bearing ring 12 is shown as applied to a portion of the shell of full diameter.

In the several constructions illustrated the drum is supported through the bearing ring upon two sliding-friction shoes 3 and 4 which are disposed at opposite sides of the vertical central plane of the drum. Each shoe is relatively short and has its bearing surface shaped to conform substantially to the surface of the bearing ring and to permit efficient lubrication.

In the operation of mills of the character referred to, under the varying conditions of load, etc., there is inevitably more or less departure of the bearing rings from exact shape and disposition. This would result in excessive wear, possible breakage of parts, and considerable friction loss if the shoes were held fixedly in position. To overcome this difficulty each shoe, in accordance with the present invention, is so supported that its bearing surface may always adjust itself automatically to the bearing surface of the bearing ring with which it coacts.

In the construction shown, each shoe 3 or 4 is hingedly mounted, as by a pin 5, parallel with the axis of the drum, upon an intermediate plate 6, which in turn is hingedly mounted, as by a pin 7, transverse to the axis of the drum, on a base 8 which is suitably inclined. By this construction each bearing shoe 3 or 4 is permitted to accommodate itself to variations in the surface of the bearing ring 2 so that the pressure transmitted to the shoe will be uniform throughout the surface of the shoe.

In order to protect the sliding-friction supporting shoes and the turned bearing surfaces of the bearing ring on the drum against dust, a casing 9 encloses the shoes and bearing rings, a suitable packing being provided at the points 10 where the casing immediately adjoins the drum. The lubricant may be applied in any convenient manner.

I claim as my invention:

In a tube mill and the like, the combination with the drum of the mill of a turned bearing ring applied to the drum, sliding-friction supporting shoes disposed one at each side of the central vertical plane of the drum for coaction with the bearing ring, a supporting base for each shoe, and a plate interposed between the shoe and the supporting base, the shoe being hingedly supported upon the intermediate plate and the plate being hingedly supported upon the base, with the axis of one hinge support parallel with the axis of the drum and the axis of the other hinge support transverse to the axis of the drum, whereby the shoe is free to accommodate itself to varying positions of the contact surface of the bearing ring and the pressure will be transmitted from the drum to the shoe throughout the surface of the shoe.

This specification signed this 21st day of March A. D. 1928.

MICHAEL TRESCHOW.